(12) United States Patent  (10) Patent No.: US 9,244,563 B2
Nam Goong et al.  (45) Date of Patent: Jan. 26, 2016

(54) METHOD AND APPARATUS FOR PROVIDING USER KEYPAD IN A PORTABLE TERMINAL

(75) Inventors: Bo Ram Nam Goong, Seoul (KR); Hwang Joon Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 145 days.

(21) Appl. No.: 13/314,426

(22) Filed: Dec. 8, 2011

(65) Prior Publication Data

US 2012/0146916 A1  Jun. 14, 2012

(30) Foreign Application Priority Data

Dec. 10, 2010  (KR) .................. 10-2010-0126146

(51) Int. Cl.
 *G06F 3/02* (2006.01)
 *G06F 3/041* (2006.01)
 *G06F 3/0488* (2013.01)

(52) U.S. Cl.
 CPC .......... *G06F 3/0416* (2013.01); *G06F 3/04886* (2013.01)

(58) Field of Classification Search
 USPC ............... 341/22, 23, 176; 345/156, 158, 30; 358/1.1, 400; 369/30.04; 370/401; 379/355.01; 455/156.1, 466, 550.1, 455/556.1, 566; 463/16; 701/533; 704/270
 See application file for complete search history.

(56) References Cited

U.S. PATENT DOCUMENTS

| | | | | |
|---|---|---|---|---|
| 7,970,438 | B2* | 6/2011 | Yoon | G06F 1/1624 345/168 |
| 8,300,023 | B2* | 10/2012 | Forutanpour et al. | 345/173 |
| 2005/0206730 | A1* | 9/2005 | Hagiwara | G06F 3/0426 348/169 |
| 2009/0066659 | A1* | 3/2009 | He | G06F 3/0416 345/173 |
| 2009/0167706 | A1* | 7/2009 | Tan | G06F 3/04886 345/173 |
| 2010/0259561 | A1* | 10/2010 | Forutanpour | G06F 3/0216 345/660 |
| 2011/0102335 | A1* | 5/2011 | Miyamura | G06F 3/04886 345/173 |
| 2011/0163955 | A1* | 7/2011 | Nasiri | A63F 13/06 345/158 |
| 2011/0242138 | A1* | 10/2011 | Tribble | G06F 3/04886 345/663 |
| 2012/0032877 | A1* | 2/2012 | Watkins, Jr. | G06F 1/1624 345/156 |

FOREIGN PATENT DOCUMENTS

JP  2001-175392 A  6/2001
JP  2005-115808 A  6/2005

* cited by examiner

*Primary Examiner* — Kathy Wang-Hurst
*Assistant Examiner* — Douglas Wilson
(74) *Attorney, Agent, or Firm* — Jefferson IP Law, LLP

(57) ABSTRACT

A method of providing a user defined user key pad and a mobile terminal supporting the same are provided. The method includes displaying guide information when entering a user key pad setting mode, determining a designation range for the user key pad according to a user interaction inputted based on the guide information, computing a key arrangement of the user key pad in response to the determined range, and configuring the user key pad according to the computed key arrangement.

20 Claims, 7 Drawing Sheets

METHOD AND APPARATUS FOR PROVIDING USER KEYPAD IN A PORTABLE TERMINAL

PRIORITY

This application claims the benefit under 35 U.S.C. §119 (a) of a Korean patent application filed on Dec. 10, 2010 in the Korean Intellectual Property Office and assigned Serial No. 10-2010-0126146, the entire disclosure of which is hereby incorporated by reference.

BACKGROUND OF THE INVENTION

1. Field of the Invention

The present invention relates to a method of providing a user defined user key pad and a mobile terminal supporting the same. More particularly, the present invention relates to a method of providing a user key pad which is capable of setting and operating a touch based user key pad according to user definition in an area having a range according to user designation and a mobile terminal supporting the same.

2. Description of the Related Art

Recently, due to the development of information and communication technology and semi-conductor technology, mobile terminals are widely used. Recent mobile terminals now include functionality of other types of terminals beyond the traditional functionality of mobile terminals. In addition to general telecommunication functions such as a voice communication and a short message service, various multimedia functions are being included, such as a TV function (e.g., mobile broadcasting like a Digital Multimedia Broadcasting (DMB) and a Digital Video Broadcasting (DVB)), a music play function (e.g., MPEG Audio Layer-3 (MP3)), a photographing function, an internet access function, and a dictionary search function.

Recent mobile terminals have been developed in such a manner that the size of the display unit is larger than the size of existing mobile terminals. For example, tablet Personal Computers (PC) are presently becoming popular. Accordingly, technology relating to the convenience of the user input mode should be developed in response to these changes. For example, when a user inputs a character using an existing keypad expanded according to the size of display unit in a mobile terminal such as the tablet PC, there exists a problem in that the user has to perform the input with one hand while holding the mobile terminal with the other hand, or has to perform the input with both hands while placing the mobile terminal on a table or other surface.

SUMMARY OF THE INVENTION

Aspects of the present invention are to address at least the above-mentioned problems and/or disadvantages and to provide at least the advantages described below. Accordingly, an aspect of the present invention is to provide a mobile terminal which is capable of setting a user defined user key pad in a mobile terminal supporting a touch based input interface and an operation method thereof.

Another aspect of the present invention is to provide a method and a mobile terminal for supporting a user setting based key pad for addressing a problem that user input of existing touch based keypad is inconvenient in a mobile terminal due to a size of a display unit.

Another aspect of the present invention is to provide a method and a mobile terminal for setting a range in which an input is possible according to user definition in a display unit of a mobile terminal, and to provide a touch based user key pad corresponding to user definition within a set range.

Another aspect of the present invention is to provide a method and a mobile terminal for improving usability and convenience of a mobile terminal by implementing a new input environment for user input in a mobile terminal.

In accordance with an aspect of the present invention, a method of providing a user key pad in a mobile terminal is provided. The method includes displaying guide information when entering a user key pad setting mode, determining a designation range for the user key pad according to a user interaction inputted based on the guide information, computing a key arrangement of the user key pad in response to the determined range, and configuring the user key pad according to the computed key arrangement.

In accordance with another aspect of the present invention, a computer-readable recording medium is provided on which a program for executing the method in a processor is recorded.

In accordance with another aspect of the present invention, a mobile terminal is provided. The mobile terminal includes a display unit for displaying guide information when setting a user key pad, and for displaying a touch based user key pad corresponding to a currently executing application, a storage unit for storing setting information related to the user key pad according to a user setting, and a controller for determining a designation range for the user key pad based on a user interaction inputted according to the guide information, and for configuring the user key pad according to a key arrangement computed in response to the determined range.

As described above, according to a user key pad providing method and apparatus in the mobile terminal suggested in aspects of the present invention, a convenience according to user input can be improved in the mobile terminal through the implementation of new input environment in response to a size increment of the display unit of the mobile terminal.

According to an aspect of the present invention, a touch based user key pad according to user definition can be set within a range that the user can designate.

According to an aspect of the present invention, it is possible to set a user key pad adjustable to each user as the size of the display unit and the size of the hand of each user are different.

According to an aspect of the present invention, the user key pad may be configured by various combinations according to the user's taste.

Moreover, the user key pad according to user setting may be automatically changed to a combination for optimum input environment and displayed in a currently executing application.

Aspects of the present invention may be implemented in all device types supporting user input using a touch based keypad.

Aspects of the present invention support an input environment optimized for each user using a mobile terminal, so that the usability, the convenience and the competitive power of the mobile terminal can be enhanced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and a mobile terminal for providing a touch based user defined user key pad. Exemplary embodiments of the present invention may configure a key pad optimized for an input environment of user according to the size of display unit and the size of a user's hand. Exemplary embodiments of the present invention may configure at least two key pad combinations which are separately configured when using a user defined user key pad, and may automatically change the combination of user key pad to a combination optimized for an executing application. Exemplary embodiments of the present invention may support a user input according to the change of posture information of the mobile terminal when using a user key pad.

Figure 1:
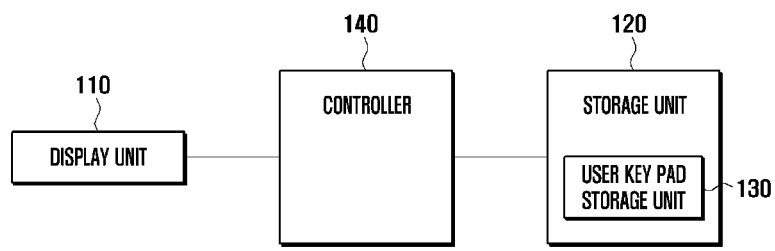
FIG. 1 is a block diagram illustrating a schematic configuration of a mobile terminal according to an exemplary embodiment of the present invention.

FIG. 1 is a block diagram illustrating a schematic configuration of a mobile terminal according to an exemplary embodiment of the present invention.

Referring to FIG. 1, the mobile terminal includes a display unit 110, a storage unit 120 and a controller 140. The mobile terminal may further include an audio processing unit equipped a microphone and a speaker, a digital broadcasting module for performing reception and playing of digital broadcasts (e.g., mobile broadcasting such as a Digital Multimedia Broadcasting (DMB) or a Digital Video Broadcasting (DVB)), a camera module for a photo/video function, a Bluetooth communication module for performing a Bluetooth telecommunication function, an internet communications module for performing an internet communications function, a touch pad for touch based input, an input unit supporting a physical key input, a sensing module (e.g., an acceleration sensor, a gyro sensor, or the like) for sensing a change of posture information of the mobile terminal, and a battery for supplying power to the above described elements, but the description and illustration of these components are omitted for clarity.

The display unit 110 provides an execution screen of applications supported by the mobile terminal as well as a home screen of the mobile terminal. For example, the display unit 110 provides an execution screen for a message function, an e-mail function, an internet function, a multimedia function, a search function, a telecommunication function, an electronic book (e.g., e-book) function, a photo/video function, a photo/video playing function, a TV function (e.g., a mobile broadcasting function such as DMB and DVB), a music playing function (e.g., a MP3 function), a widget function, a memo function, a game mode, or the like.

The display unit 110 typically uses a Liquid Crystal Display (LCD), but other display devices such as a Light Emitting Diode (LED), an Organic LED (OLED), and an Active Matrix OLED (AMOLED) may be used. The display unit 110 displays guide information for user key pad setting, and may indicate a user key pad which is configured according to user definition. When displaying the above described execution screen (e.g., execution screen including a touch based user key), the display unit 110 may provide a landscape mode or a portrait mode according to the rotational direction (or the placed direction) of the mobile terminal.

The display unit 110 may include an interface supporting a touch based input. For example, the display unit 110 may support a touch based user input with a touch-screen and generate an input signal according to the user input to send to the controller 140. Only a single display unit 110 is shown in FIG. 1, but exemplary embodiments of the present invention are not limited thereto. The mobile terminal may include two or more display units.

The storage unit 120 stores various programs and data which are executed and processed in the mobile terminal, and may be include one or more nonvolatile memories and volatile memories. The nonvolatile memory may include Read Only Memory (ROM), flash memory, or the like. The volatile memory may include Random Access Memory (RAM), or the like. The storage unit 120 may continuously or temporarily store an operating system of the mobile terminal, a program and data relating to a display control operation of the display unit 110, a program and data relating to an input control operation using the display unit 110, a program and data relating to a control operation for setting a user key, and a program and data relating to a control operation for supporting a user input according to posture information of mobile terminal. The storage unit 120 may also include a user key pad storage unit 130 which stores guide information for setting a user key pad, and various setting information relating to a user key pad configured according to user definition.

The controller 140 controls the overall operation of the mobile terminal. The controller 140 may control operations for supporting a customized keypad according to an exemplary embodiment of the present invention, i.e., a touch based user defined user key pad. For example, the controller 140 may control an operation relating to the setting of the location and the size of the keypad in response to user input. The controller 140 computes the key arrangement of the keypad in response to the range of keypad setting established by user, and configures the keypad according to the computed key arrangement.

The controller 140 may control the positioning of a specific key, a repositioning between specific keys and the key arrangement according to the positioning in the user key pad which is configured according to user definition. The controller 140 may control an operation relating to the function according to the detection of posture information of the mobile terminal in an input environment using user key pad. The controller 140 can extract and provide a user key pad configuration with an optimized combination for any application of the mobile terminal Operation of the controller 140 is described below. In addition, the controller 140 may control various operations relating to a normal function of the mobile terminal. For example, the controller 140 may control the operation and data display in the execution of an application of the mobile terminal.

The controller 140 may receive an input signal corresponding to various input modes supported by a touch based input interface and can control a relevant function operation. For example, the controller 140 may control character display corresponding to user input using the touch based user key pad.

The mobile terminal may be a bar type, a folder-type, a slide type, a swing type, and a flip type. The mobile terminal may be any type of information and communication equipment, multimedia device, and application equipment. For example, the mobile terminal may be a tablet Personal Computer (PC), smart phone, Portable Multimedia Player (PMP), digital broadcasting player, Personal Digital Assistant (PDA), mobile game terminal, and electronic book terminal, as well as a mobile communications terminal operating based on respective communication protocols corresponding to various communications system.

Figure 2:
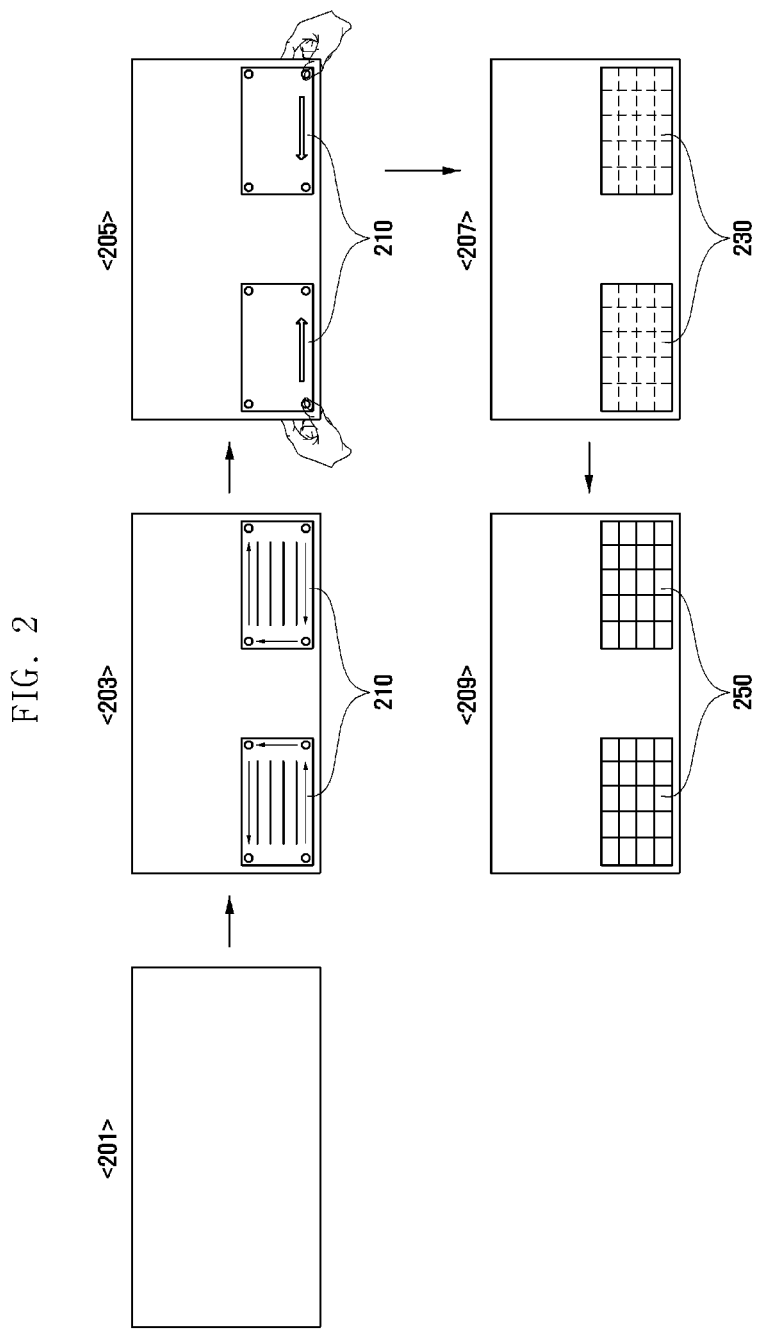
FIG. 2 illustrates an operation of setting a user defined user key pad in a mobile terminal according to an exemplary embodiment of the present invention.

FIG. 2 illustrates an operation of setting a user defined user key pad in a mobile terminal according to an exemplary embodiment of the present invention.

Referring to FIG. 2, reference numeral 201 shows the mobile terminal in a standby state, and displays a relevant screen. If the mobile terminal uses a specific mode according to the execution of a specific application or uses a home screen, relevant screen data can be displayed in reference numeral 201. In the state shown in reference numeral 201, the user may execute a keypad setting mode for a user key pad. For example, the user may input an interaction for executing the keypad setting mode through the operation of the mobile terminal.

As shown in reference numeral 203, the controller 140 can display an initial screen for the keypad setting. The initial screen for the keypad setting may correspond to a step of providing guide information 210. The guide information 210 may be displayed in both sides based on a screen center in response to the left hand and the right hand of user. The guide information 210 may be displayed in two classified areas. The guide information 210 includes information for the designation of an area in which the user can input by using a finger (e.g., the left hand thumb and the right hand thumb) through the classified area. The information for the designation of the area may include text (e.g., touch by thumb and move in an arrow direction), and an item (e.g., arrow).

In the state shown in reference numeral 203, the user may input an interaction for designation of an area according to the guide information. For example, the user may hold the mobile terminal by both hands (or place the mobile terminal on a desk). In this state, as shown in reference numeral 205, the user may separately or simultaneously input the interaction moving on each area which displays the guide information 210 in a range in which the user can input. In case of the left hand in reference numeral 205, the user may touch an initial location for the designation of range and move to a distance movable to the right side according to the guide information 210, move to a distance movable to the upper side from an initial point moved to the right side, move to a distance movable to the left side from an initial point moved to the upper side, and release the input. The controller 140 may trace a movement route of interaction and draw a virtual line according to the traced route to compute a rectangular area. The mobile distance may be different for each user, and may be a maximum distance that the input of the outer-most key of the keypad is possible according to the size of the hand of the user or may be an arbitrary distance which is arbitrarily drawn by the user.

When the range of the user is designated according to the user interaction, the controller 140 may configure and display a user key pad within a designated range as shown in reference numeral 207. The user key pad shown in reference numeral 207 may be a virtual keypad for the confirmation of the user, and may be omitted. The configuration of reference numeral 207 may confirm to that user whether the user key pad is appropriately configured according to the user's designation. The user may configure the keypad to have a more optimum range and key arrangement by re-designation through the above process.

When the virtual keypad is provided as shown in reference numeral 205, the controller 140 may recognize the designated range, and may compute the key arrangement which can be configured in both ranges of the right side and the left side. For example, the controller 140 may calculate the width and the height of respective keys for arranging keys allocated within a range and an interval between keys, and may determine a corresponding key arrangement. This enables the controller 140 to configure the virtual user key pad 230 according to the determined key arrangement. When a given time set in the state shown in reference numeral 207 elapses or when the user confirms, the controller 140 may display the finally decided user key pad 250, as shown in reference numeral 209, through the two classified areas.

The controller 140 may store relevant setting information about the user key pad 250 configured as described above. For example, the controller 140 may store various setting information relating to the range information of the left side, the range information of the right side, the key arrangement information according to the left side range, the key arrangement information according to the right side range, the keypad type information which is set in the left side, and the keypad type information which is set in the right side.

Figure 3:
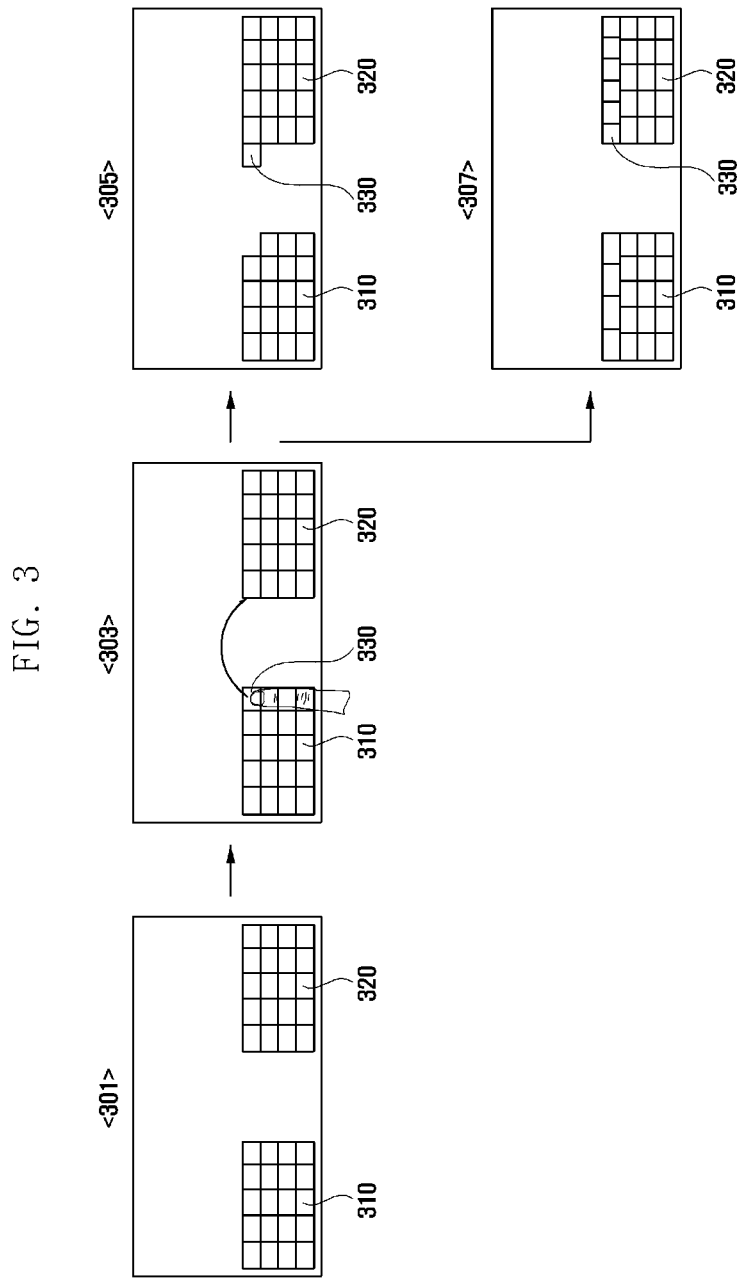
FIG. 3 illustrates an operation of rearranging a key of user key pad in a mobile terminal according to an exemplary embodiment of the present invention.

FIG. 3 illustrates an operation of rearranging a key of user key pad in a mobile terminal according to an exemplary embodiment of the present invention.

Referring to FIG. 3, a touch based user defined user key pad is displayed by the operation of FIG. 2 as shown in reference numeral 301. The user key pad may be displayed as a left key pad 310 and a right key pad 320 through the classified areas of the right side and the left side. As shown in reference numeral 301, the user may arbitrarily set the key arrangement of the left key pad 310 or the right key pad 320. For example, as shown in reference numeral 303, the user may input an interaction of moving a specific key 330 from the left key pad 310 to the right key pad 320.

The user may input an interaction which drags and drops the specific key 330 to a desired location in the right key pad 320. According to the interaction of moving the specific key 330 from the keypad of one area as shown in reference numeral 303 to the keypad of another area as shown in reference numeral 305, the specific key 330 according to the user selection as shown in reference numeral 305 or reference numeral 307 may be arranged in the keypad of the other area according to a setting type as shown in reference numeral 305 or reference numeral 307. For example, as shown in reference numeral 305, the specific key 330 is moved and added while the existing form of the right key pad 320 is maintained such that the specific key 330 is arranged at a point where user interaction is performed. As shown in reference numeral 305, a portion in which the specific key 330 is located in the left key pad 310 may be blank.

Alternatively, as shown in reference numeral 307, the key arrangement of the corresponding line may be reconfigured to include the specific key 330 which is moved and added in the range allocated to the right key pad 320. In this case, the controller 140 may determine a range where the right key pad 320 is allocated, and may perform key arrangement by rearranging an interval of each key of line including the specific key 330 within a corresponding range. As the specific key 330 also comes off in the left key pad 310 as shown in reference numeral 307, the arrangement for the keys of line where the specific key 330 is positioned may be performed.

Similarly, the case of reference numeral 305 and reference numeral 307 may be provided in a mixed form. For example, while the left key pad 310 is maintained as shown in reference numeral 305, the right key pad 320 may rearrange a corresponding line including the added specific key 330 as shown in reference numeral 307.

In FIG. 3, the operation of moving the specific key 330 of the left key pad 310 to the right key pad 320 is illustrated, but exemplary embodiments of the present invention are not limited thereto. The specific key 330 may be moved to an arbitrary location within the left key pad 310 and displayed. Alternatively, while being maintained in the left key pad 310, the specific key 330 may be copied to the right key pad 320, so that the same specific key 330 may be displayed in both of the left key pad 310 and the right key pad 320.

Figure 4:
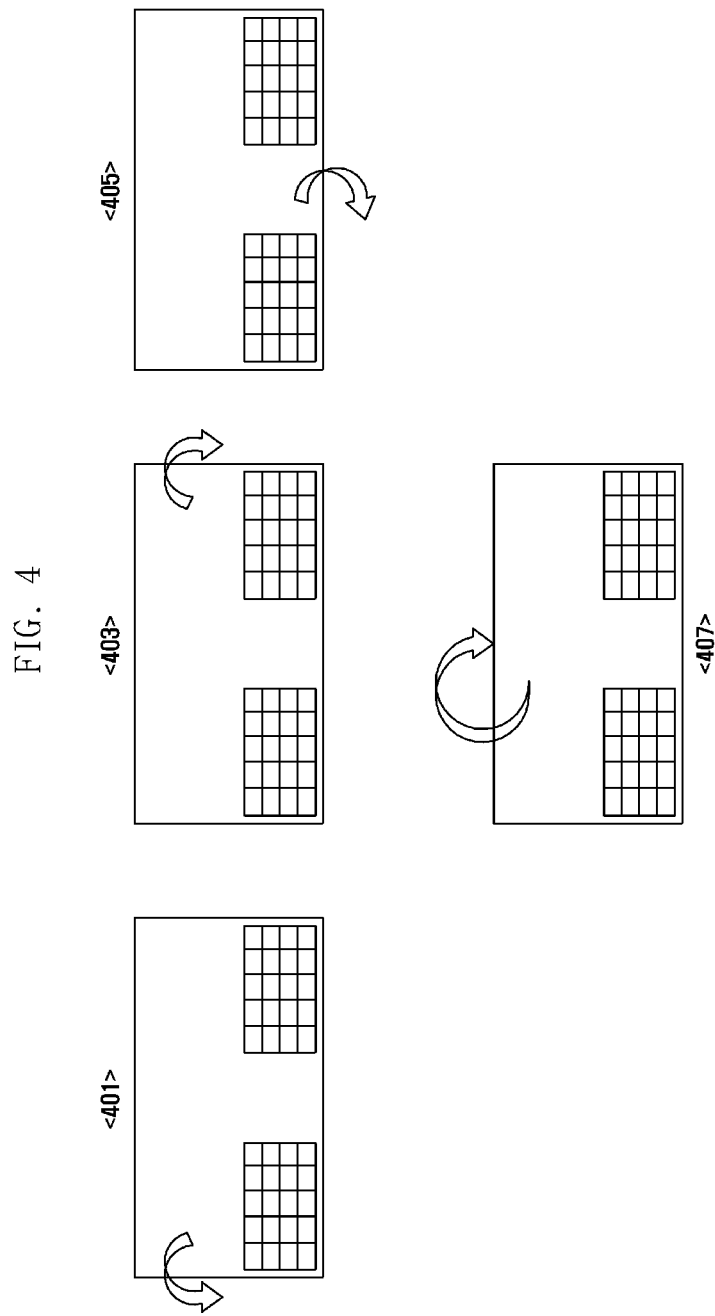
FIG. 4 illustrates an operation supporting a user input using a user key pad and posture information of a mobile terminal according to an exemplary embodiment of the present invention.

FIG. 4 illustrates an operation supporting a user input using a user key pad and posture information of a mobile terminal according to an exemplary embodiment of the present invention.

Referring to FIG. 4, as described above, the user may perform a user input through a user key pad which is generated in response to an input environment of the user. For example, in a text input mode, a character input may be performed through the user key pad. The user may perform the character input using the separately defined posture information change of the mobile terminal, in addition to the character input using the user key pad.

For example, as shown in reference numeral 401, the user may incline the mobile terminal in a left direction during a specific user input (e.g., character input). The controller 140 detects the posture information change of the mobile terminal, and may determine the change direction of the detected posture information. The controller 140 may execute a function mapped to the determined posture information. For example, the left inclination may correspond to a back-space function.

As shown in reference numeral 403, the user may incline the mobile terminal to the right side during a specific user input (e.g., character input). The controller 140 may execute a function mapped to corresponding posture information upon detecting the posture information change of the mobile terminal and determining the direction of the posture information change. The right inclination may correspond to a space function.

As shown in reference numeral 405, the user may tilt the mobile terminal downward during a specific user input (e.g., character input). The controller 140 may execute a function mapped to the corresponding posture information upon detecting the posture information change of the mobile terminal and determining the direction of the posture information change. The downward tilt may correspond to an enter function.

As shown in reference numeral 407, the user may tilt the mobile terminal the upward during a specific user input (e.g., character input). The controller 140 may execute the function mapped to corresponding posture information upon detecting the posture information change of the mobile terminal and determining the direction of the posture information change. The upward tilt may correspond to a menu (e.g., menu for font setting) function.

Although not shown in FIG. 4, a mobile terminal according to exemplary embodiments of the present invention may further include a component to detect posture information when performing operations described above with respect to FIG. 4. For example, the mobile terminal may include a gyro sensor or an acceleration sensor.

A key corresponding to a function mapped to the posture information may be omitted in a user customized keypad according to an exemplary embodiment of the present invention when supporting the user input using the posture information. For example, when a function such as back space, space, enter, and menu is mapped according to posture information as shown in FIG. 4, corresponding keys (e.g., back space, space, enter, and menu) may be omitted from the user key pad. Accordingly, an interval between keys configuring the user key pad may be expanded or an additional application for new keys may be possible. If the posture information as described above is maintained for a certain time, the relevant function may be repeated. For example, when the inclination to the left direction of the mobile terminal is maintained for a certain time, the back space function can be executed repeatedly as long as the corresponding posture information (e.g. left inclination) is maintained.

Figure 5:
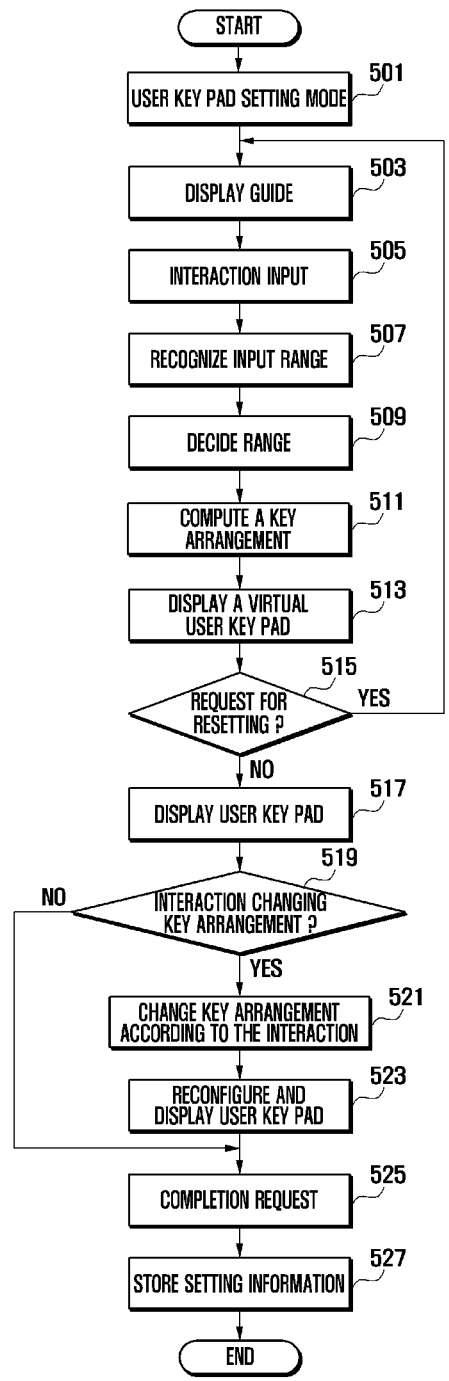
FIG. 5 is a flowchart illustrating a method for providing a user defined user key pad in a mobile terminal according to an exemplary embodiment of the present invention.

FIG. 5 is a flowchart illustrating a method for providing a user defined user key pad in a mobile terminal according to an exemplary embodiment of the present invention.

Referring to FIG. 5, the controller 140 executes a user key pad setting mode in response to a user request in step 501. As described in FIG. 2, the controller 140 displays guide information in the execution of the user key pad setup mode in step 503. When interaction for range designation of the user is inputted after the guide information is displayed in step 505, the controller 140 recognizes a range according to the interaction in step 507 and determines a final range for the configuration of the user key pad in step 509. For example, the controller 140 may trace the movement route of interaction and draw a virtual line according to the traced route to compute a rectangular area, so that the range for the configuration of the user key pad may be determined.

The controller 140 computes a key arrangement for respective keys to configure the user key pad in the determined range in step 511. For example, the controller 140 may recognize the range designated according to the interaction, and compute a key arrangement which can be configured in the recognized range. The controller 140 calculates the width, the height, and the interval of each key of the user key pad so as to configure the user key pad within a range and determine a corresponding key arrangement. This process includes determining an arrangement for keys of the user key pad so that the user key pad can be included within the determined range.

The controller 140 configures and displays a virtual user key pad through the determined range in step 513. A virtual keypad may be temporarily provided within the determined range in step 513, to permit the user to confirm the configuration. Accordingly, step 513 may be omitted.

The controller 140 may determine whether a request for resetting exists in step 515. For example, when the virtual user key pad provided within the range is configured differently from the user's purpose and displayed, the user can request a resetting. Similarly, when the virtual user key pad provided within the range is configured to coincide with the user's purpose and displayed, the user may determine the use of the corresponding user keypad. When a given time elapses after the virtual user key pad is provided or when the user confirms, the controller 140 may recognize, without the resetting request, that the user key pad setting is based on the virtual user key pad.

When resetting is requested (YES of step 515), the controller 140 returns to step 503 and may control the next operation. When resetting is not requested (NO of step 515), the controller 140 configures the user key pad having a key arrangement which is finally decided based on the virtual user key pad, and displays the user key pad in step 517.

The controller 140 determines whether an interaction input which changes key arrangement exists in step 519. For example, as described in FIG. 3, the user may input (e.g., drag and drop) the interaction of moving or copying a specific key of the user key pad to another location. The controller 140 proceeds to step 525 when the input of key arrangement change interaction does not exist (NO of step 519. When the input of key arrangement change interaction exists (YES of step 519), the controller 140 changes the key arrangement according to the interaction in step 521, and accordingly, reconfigures and displays the user key pad in step 523. An example of such operation is illustrated in FIG. 3.

When the completion of user key pad setting is requested in step 525, the controller 140 may store relevant setting information about the user key pad configured by the above described operation in step 527. For example, the controller 140 may store various setting information relating to range information of the left side, range information of the right side, key arrangement information according to the left side range, key arrangement information according to the right side range, keypad type information which is set in the left side, and keypad type information which is set in the right side.

Figure 6:
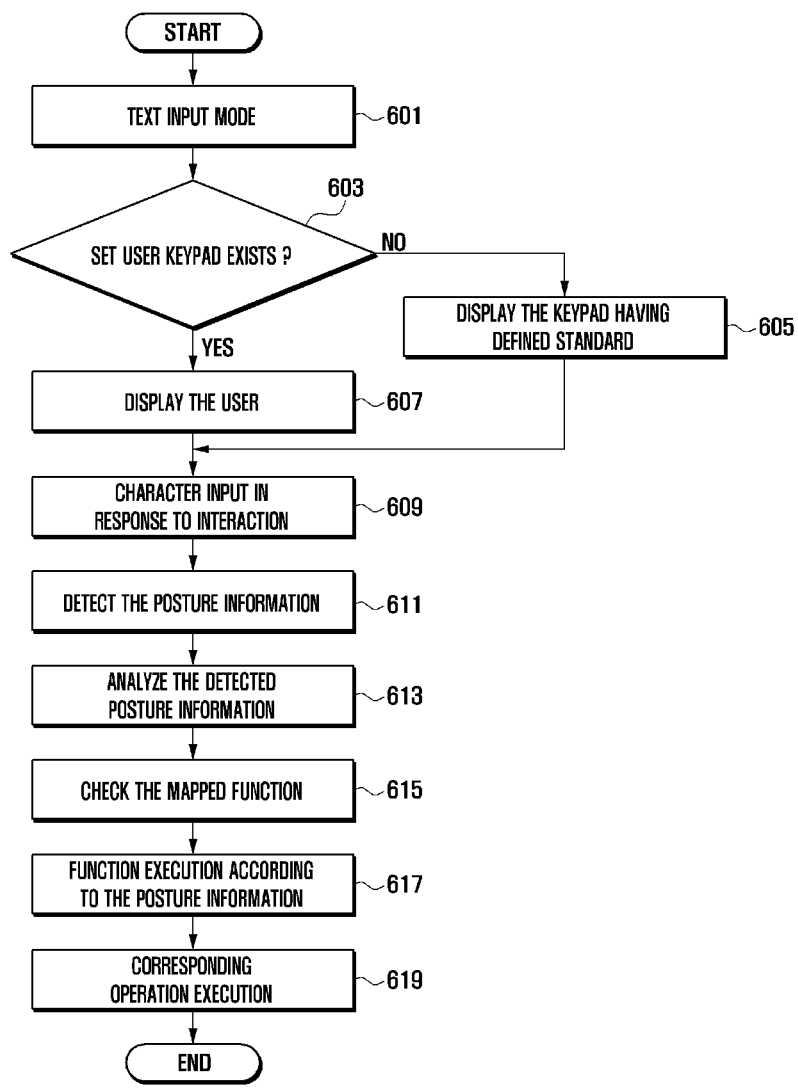
FIG. 6 is a flowchart illustrating a method for operating a user key pad when using the user defined user key pad in a mobile terminal according to an exemplary embodiment of the present invention.

FIG. 6 is a flowchart illustrating a method for operating a user key pad when using the user defined user keypad in a mobile terminal according to an exemplary embodiment of the present invention.

Referring to FIG. 6, the controller 140 operates a text input mode in response to the request of the user in step 601. The controller 140 determines whether a set user keypad exists in step 603. When a set user keypad does not exist (NO at step 603), the controller displays the user keypad having a standard defined in the mobile terminal on a given area in step 605. When a set user keypad exists (YES at step 603), the controller 140 displays the user keypad generated by a user definition in a location within a designated range in step 607. Hereinafter, the user keypad having the defined standard, and the user keypad generated by the user definition are both denoted as "user keypad".

The controller 140 processes the character input in response to a user interaction using the user keypad in step 609. The controller 140 detects posture information indicating that the posture of the mobile terminal is changed as the mobile terminal inclines or tilts to a pre-defined direction while the controller 140 processes the user keypad based character input in step 611. The controller 140 analyzes the detected posture information in step 613, and determines the function mapped to corresponding posture information in step 615. The controller 140 controls the function execution according to the posture information in step 617.

For example, as described in FIG. 4, the controller 140 may control back space function execution mapped to the posture information in response to the left inclination, control space function execution mapped to the posture information in response to the right inclination, control enter function execution mapped to the posture information in response to the downward tilt, or control menu function execution mapped to the posture information in response to the upward tilt.

The controller 140 controls corresponding operating performance after the function execution according to the posture information in step 619. For example, the controller 140 may process operating performance according to a character input by user using user keypad. Similarly, the controller 140 may repeatedly execute the corresponding function mapped to the posture information when the corresponding posture information is maintained even after the function execution corresponding to the posture information. For example, the controller 140 may repeatedly execute the back space function mapped to the posture information corresponding to the left inclination while the mobile terminal maintains a leftward inclination.

Figure 7:
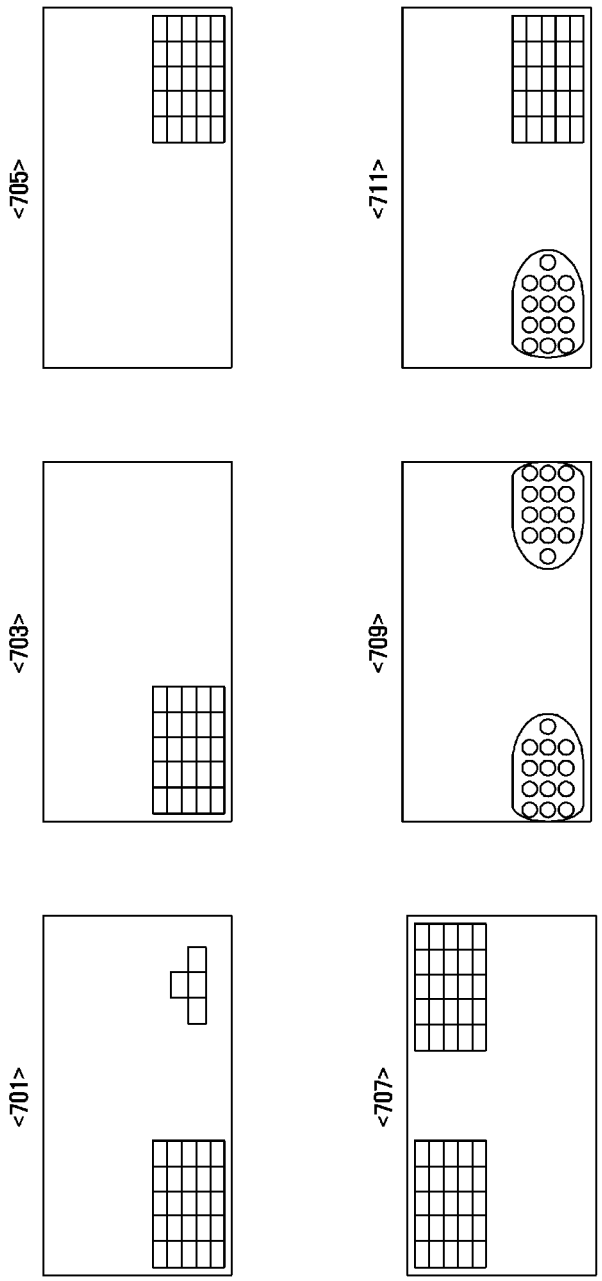
FIG. 7 is a drawing illustrating a user key pad supported by a mobile terminal according to an exemplary embodiment of the present invention.

FIG. 7 is a drawing illustrating a user keypad supported by a mobile terminal according to an exemplary embodiment of the present invention.

Referring to FIG. 7, the user may include a user customized keypad corresponding to the user's input environment through the above described operation. According to an exemplary embodiment of the present invention, a user keypad may be configured according to the input environment of the user such as both hands of the user, the holding state of the mobile terminal, the size of the user's hand (e.g., hand size, finger length, or the like). Additionally, the user keypad may provide not only a single keypad structure composed of one type, but also a composite keypad structure composed of a combination of at least two kinds of types which are different one another.

The user may set a user keypad with various types of keypad combinations. For example, as shown in reference numeral 701, a keypad having a native language keyboard may be set on the left side, and a keypad having a direction key may be set on the right side. The user keypad may be set by various combinations of the native language keyboard, the foreign language keyboard, the calculator keyboard, the character keyboard, the number keyboard, other keyboards, or user-designed keyboards.

The user may set a user keypad using a specific given area. For example, a user keypad which uses only the left side may be set as shown in reference numeral 703, or a user keypad which uses only the right side can be set as shown in reference numeral 705. The user may arrange and set the user keypad on a desired location. For example, as shown in reference numeral 707, the user may arrange and display the user keypad using the upper area. The user can set the user keypad in various shapes, such as a polygon (e.g., ellipse, or the like), in addition to the user keypad of the above described rectangular type. For example, as shown in reference numeral 709, an elliptical keypad may be set. Additionally, as shown in reference numeral 711, the user keypad can be set by a combination of the square and polygon.

Although not shown in FIG. 7, various types of user keypads similar to those shown in reference numerals 701 to 711 may be stored according to a user definition. The user may create a user keypad according to application type. Accordingly, an optimized user customized-keypad may be provided for any application in the mobile terminal. For example, when an application which frequently uses the native language input is executed, a keypad configured as a native language keyboard may be used. When space utilization is needed, a keypad which is configured only in one side may be used such as those shown in reference numeral 703 and reference numeral 705.

When an application which frequently uses a number input is executed, a keypad configured of the number keyboard may be used. Also, when a calculator function is needed, a keypad configured of a calculator keyboard may be used. When an application like a game is executed, a keypad configured of a direction key may be used as shown in reference numeral 701.

As described above, according to exemplary embodiments of the present invention, the optimized user keypad may be set for any application of the mobile terminal. Accordingly, the convenience of user input may be improved in using the mobile terminal.

The method of providing a user customized user keypad may be implemented in the form of a program command executable by various computer means and recorded in a non-transitory computer readable recording medium. In this case, the computer readable recording medium may include a program command, a data file, and a data structure individually or a combination thereof. The program command recorded in a recording medium may be specially designed or configured for exemplary embodiments of the present invention or be known to a person having ordinary skill in a computer software field to be used.

The computer readable recording medium includes Magnetic Media such as hard disk, floppy disk, or magnetic tape, optical media such as Compact Disc Read Only Memory (CD-ROM) or Digital Versatile Disc (DVD), magneto-optical media such as floptical disk, and a hardware device such as ROM, RAM, and flash memory storing and executing program commands. Further, the program command includes a machine language code created by a complier and a high-level language code executable by a computer using an interpreter. The foregoing hardware device may be configured to be operated as at least one software module to perform an operation of the present invention, and a reverse operation thereof is the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing a user key pad in a mobile terminal, the method comprising:
   receiving a user selection designating a left key pad perimeter and a right key pad perimeter, the left key pad perimeter being separated from the right key pad perimeter;
   displaying a visual indication of the right key pad perimeter and the left key pad perimeter;
   in response to the user selection, computing a key arrangement of the user key pad within the left key pad perimeter and the right key pad perimeter after the displaying of the visual indication; and
   configuring and displaying the user key pad according to the computed key arrangement, wherein
   the user key pad includes a plurality of keys in the right key pad perimeter and a plurality of key in the left key pad perimeter.

2. The method of claim 1, wherein the configuring and displaying of the user key pad
   comprises reconfiguring and displaying the key arrangement of the user key pad in response to an interaction of moving or copying a key of the user key pad to another location.

3. The method of claim 2, wherein the computing of the key arrangement of the user key pad comprises
   computing a width, a height of each key in the user key pad, and an interval between keys.

4. The method of claim 2, wherein the computing of the key arrangement of the user key pad comprises
   determining an arrangement for the keys of the user key pad in such a manner that the user key pad is included in the determined range.

5. The method of claim 2, further comprising:
   providing a virtual user key pad configured according to the computed key arrangement for confirmation by a user.

6. The method of claim 1, further comprising:
   storing related setting information for the user key pad.

7. The method of claim 6, wherein the storing of the related setting information comprises
   storing setting information related to information of a range where the user key pad is configured, key arrangement information according to a corresponding range, and type information of the user key pad.

8. The method of claim 2, further comprising:
   detecting a change of posture information of the mobile terminal when a user input is received using the user key pad; and
   executing an input function according to the changed posture information in the detection of the posture information.

9. The method of claim 8, wherein the configuring and displaying of the user key pad comprises
   configuring and displaying the user key pad such that corresponding keys for function execution mapped to the posture information in the user key pad are omitted from the user key pad.

10. The method of claim 1, wherein the receiving of the user selection comprises:
    tracing a movement route of a user interaction;
    computing a rectangular range by drawing a virtual line according to the traced route; and
    designating at least one of the first perimeter and the second perimeter according to the computed rectangular arranged.

11. The method of claim 1, further comprising:
configuring and displaying a plurality of user key pads with various key pad combinations.

12. The method of claim 1, further comprising:
providing a user key pad of another combination according to execution of an application.

13. A mobile terminal comprising:
a display unit configured to display a touch based user key pad corresponding to a currently executing application;
a storage unit configured to store setting information related to the user key pad according to a user setting; and
a controller configured
to receive a user selection designating a left key pad perimeter and a right key pad perimeter, the left key pad perimeter being separated from the right key pad perimeter,
to display a visual indication of the right key pad perimeter and the left key pad perimeter,
to compute, in response to the user selection, a key arrangement of the user key pad within the left key pad perimeter and the right key pad perimeter after the displaying of the visual indication, and
to configure and display the user key pad according to the computed key arrangement, wherein
the user key pad includes a plurality of keys in the right key pad perimeter and a plurality of key in the left key pad perimeter.

14. The mobile terminal of claim 13, wherein the setting information comprises
setting information related to information of a range where the user key pad is configured, key arrangement information according to corresponding range, and type information of user key pad.

15. The mobile terminal of claim 14, wherein the controller reconfigures and displays the key arrangement of the user key pad according to an interaction of moving or copying a key of the user key pad to another location.

16. The mobile terminal of claim 14, wherein the controller detects a change of posture information of the mobile terminal when a user enters an input via the user key pad, and controls an execution of an input function according to the changed posture information.

17. The mobile terminal of claim 16, wherein the controller configures the user key pad such that corresponding keys for the function execution mapped to the posture information in the user key pad are omitted and computes the key arrangement when supporting a user input using the posture information.

18. The mobile terminal of claim 13, wherein the user key pad is provided to have a single key pad structure having one type, or to have a composite key pad structure in which at least two kinds of types are combined.

19. The mobile terminal of claim 18, wherein the controller generates a plurality of user key pads with various keypad combinations, and provides a user key pad of combination which is different for each executing application.

20. A method of providing a user keyboard in a mobile terminal, the method comprising:
determining a left key pad perimeter and a right key pad perimeter of the user keyboard according to a user interaction;
displaying a visual indication of the right key pad perimeter and the left key pad perimeter;
after the displaying of the visual indication of the right key pad perimeter and the left key pad perimeter,
computing a key arrangement of the user keyboard in response to the determined perimeters; and
configuring and displaying the user keyboard according to the computed key arrangement, wherein
the left key pad perimeter is separate from the right key pad perimeter.

* * * * *